US010655598B2

(12) United States Patent
Lam et al.

(10) Patent No.: US 10,655,598 B2
(45) Date of Patent: May 19, 2020

(54) COUNTER-ROTATING VERTICAL AXIS WIND TURBINE WITH DEFLECTOR AND VORTEX GENERATORS

(71) Applicant: City University of Hong Kong, Kowloon (HK)

(72) Inventors: Heung Fai Lam, Hong Kong (HK); Hua Yi Peng, Hong Kong (HK)

(73) Assignee: City University of Hong Kong, Kowloon (HK)

( * ) Notice: Subject to any disclaimer, the term of this patent is extended or adjusted under 35 U.S.C. 154(b) by 493 days.

(21) Appl. No.: 15/365,075

(22) Filed: Nov. 30, 2016

(65) Prior Publication Data

US 2018/0149135 A1    May 31, 2018

(51) Int. Cl.
*F03D 3/04* (2006.01)
*F03D 3/02* (2006.01)

(52) U.S. Cl.
CPC ............. *F03D 3/0427* (2013.01); *F03D 3/02* (2013.01); *F05B 2240/122* (2013.01); *F05B 2240/214* (2013.01); *F05B 2270/20* (2013.01); *Y02E 10/74* (2013.01)

(58) Field of Classification Search
CPC combination set(s) only.
See application file for complete search history.

(56) References Cited

U.S. PATENT DOCUMENTS

| | | | |
|---|---|---|---|
| 4,156,580 A | 5/1979 | Pohl | |
| 6,674,181 B2 | 1/2004 | Harbison | |
| 6,942,454 B2 | 9/2005 | Ohlmann | |
| 7,679,209 B2 * | 3/2010 | Rashidi | F03D 3/002 290/55 |
| 8,057,159 B2 * | 11/2011 | Chong | F03D 3/049 415/4.2 |
| 8,432,056 B2 | 4/2013 | Bailey et al. | |
| 8,946,923 B2 | 2/2015 | Steel | |
| 2011/0037268 A1 * | 2/2011 | Sammy | F03D 1/025 290/55 |
| 2012/0242091 A1 | 9/2012 | Ryu et al. | |

* cited by examiner

*Primary Examiner* — Richard A Edgar
*Assistant Examiner* — Maxime M Adjagbe
(74) *Attorney, Agent, or Firm* — Norton Rose Fulbright US LLP (57) ABSTRACT

A high efficiency vertical axis wind turbine (VAWT) comprising two counter-rotating rotors, each comprising a plurality of straight rotor blades. One rotor is placed on a first vertical axis and another rotor is placed on a second vertical axis. The first vertical axis and the second vertical axis are positioned on a support structure extending there between. The support structure, and the first vertical axis of rotation and second vertical axis of rotation, can rotate about an intermediate axis of rotation, which is placed at a midpoint between the first vertical axis of rotation and second vertical axis of rotation. An angled deflector is mounted to the frame at or about the intermediate axis of rotation. During operation, the vertex of the deflector is positioned toward oncoming wind. The deflector comprises two symmetrical deflecting surfaces that extend from the vertex to the rotors. One or more vortex generators are positioned on each deflecting surface.

14 Claims, 5 Drawing Sheets

COUNTER-ROTATING VERTICAL AXIS WIND TURBINE WITH DEFLECTOR AND VORTEX GENERATORS

TECHNICAL FIELD

The present disclosure generally relates to vertical axis wind turbines. In particular, the present disclosure relates to a counter-rotating vertical axis wind turbine that includes a deflector and vortex generators thereon.

BACKGROUND

Vertical axis wind turbines (VAWTs) have been the subject of increasing interest over the past decade due to their ability to fit well within urban and other offshore areas. When traditional VAWTs are placed in low wind speed and high turbulence environments, it is difficult to achieve high efficiency, where efficiency can be defined as a ratio between power output and latent energy of the wind. Accordingly, there is a need for a high efficiency VAWT that is capable of operating in low wind speed and high turbulence environments.

SUMMARY

In view of the foregoing, embodiments described herein provide for a high efficiency vertical axis wind turbine (VAWT). Described embodiments comprise two counter-rotating rotors, each comprising a plurality of straight rotor blades. One rotor is placed on a first vertical axis of rotation and another rotor is placed on a second vertical axis of rotation. The first vertical axis of rotation and the second vertical axis of rotation are positioned on a support structure or frame extending there between. The frame, and the first vertical axis of rotation and second vertical axis of rotation, can rotate about an intermediate axis of rotation, which is placed at a midpoint between the first vertical axis of rotation and second vertical axis of rotation.

As will be described in further detail, the first and second rotors can be spaced closely to one another, facilitating a high density arrangement of rotors in urban areas and the like. Given the counter-rotor arrangement, torque and Magnus effect are balanced and structural stability is improved. Described embodiments produce a symmetrical wake that is in the best interest of the placement of multiple turbines in a given area.

VAWTs described herein comprise a deflector mounted on the support structure that, during operation of the VAWT, has a vertex positioned toward the direction of oncoming wind. The deflector is characterized by deflecting surfaces that extend from the vertex toward the rotors and deflect airflow towards the rotors. The deflector also includes one or more vortex generators placed on each of its deflecting surfaces. A wind vane assists in maintaining the vertex of the deflector towards oncoming wind.

In operation, the deflector redirects and accelerates airflow. This enhances self-starting and power performance in low wind speed conditions. Vortex generators placed on the deflecting surfaces energize the boundary layers of the rotor blades. As a result, dynamic stall can be delayed to increase power production.

In some embodiments, a control subsystem or control block measures environmental conditions, including wind direction and wind speed, and changes parameter settings to optimize power output based on those conditions. This can include changing the angle of the deflector surfaces, changing the orientation of the vortex generators on the deflecting surfaces, changing the distance between the first vertical axis of rotation and second vertical axis of rotation, and changing the relative position of the deflector and first vertical axis of rotation and second vertical axis of rotation. Also, a servo motor or the like can be used to tune the direction of the deflector with respect to wind direction and variability.

In view of the foregoing, described embodiments can overcome several limitations of traditional VAWTs, increasing power production in areas of low wind speed and high turbulence. Accordingly, such embodiments will improve the efficiency of power production, particularly in urban and offshore areas.

The foregoing has outlined rather broadly the features and technical advantages of the present invention in order that the detailed description of the invention that follows can be better understood. Additional features and advantages of the invention will be described hereinafter that form the subject of the claims of the invention. It should be appreciated by those skilled in the art that the concepts and specific embodiments disclosed can be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further benefits and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE FIGURES

For a more complete understanding of the disclosure, reference is made to the following FIGURES taken in conjunction with their accompanying descriptions.

DETAILED DESCRIPTION

Described embodiments provide for a high efficiency VAWT that can be advantageously used to generate power in areas commonly associated with low wind speed and high turbulence. Embodiments comprise two counter-rotating straight-blade rotors, a deflector with vortex generators placed on its deflecting surfaces, and a wind vane to assist in guiding the deflector into oncoming wind. The two counter-rotating straight-blade rotors harness the kinetic energy of oncoming wind, and in doing so, convert the kinetic energy into mechanical energy. Mechanical energy of the rotors is then converted into electrical energy using a generator in communication with the rotors. Further, in some embodiments, a control system is used to adjust parameters of the high efficiency VAWT to optimize power output over changing environmental conditions.

One rotor is mounted to a first vertical axis of rotation and another rotor is mounted to a second vertical axis of rotation. As discussed, the first vertical axis of rotation and second vertical axis of rotation can be spaced from one another according to a preferred system configuration. The first vertical axis of rotation and second vertical axis of rotation are mounted to a support structure or frame, which rotates about an intermediate vertical axis of rotation centered between the first vertical axis of rotation and second vertical axis of rotation.

An angled deflector is mounted to the frame at or about the intermediate axis of rotation. During operation, the vertex of the deflector is positioned toward oncoming wind. The deflector comprises two symmetrical deflecting surfaces that extend from the vertex to the rotors. One or more vortex generators are positioned on each deflecting surface. Also, a vane functions as a yaw mechanism to assist in maintaining the deflector such that its vertex faces oncoming wind and/or otherwise optimizes the position of the deflector according to environmental conditions.

As mentioned, described embodiments demonstrate significant potential for power production in low wind speed and high turbulence areas, e.g., urban areas. In doing so, embodiments provide significant advantages over traditional VAWTs and horizontal axis wind turbines (HAWTs). For instance, when compared to traditional HAWTs, embodiments are much easier to manufacture and maintain with lower costs. They also provide excellent self-starting and power performance under low wind speed and high turbulence conditions. Further, described embodiments provide closely-spaced twin rotors, contributing to increased packing density and greater power output in a localized area. While no complex yaw mechanism is required, a cost-effective and robust wind vane is used to orient the VAWT against oncoming wind.

When compared to traditional VAWTs having single rotors, described embodiments provide more power in wind farm scenarios because of increased packing density. Embodiments also provide improved structural stability by balancing the Magnus effect and asymmetrical wakes of individual rotors. In this way, vibration induced by asymmetrical loading is significantly alleviated.

Using a deflector accelerates wind speed towards the rotors and develops a cross-stream component of wind velocity. This flow development improves the self-starting performance and dramatically improves power output. Importantly, because the deflector incorporates vortex generators, small-scale vortices are generated that help energize the boundary layer flows on the rotors. As a result, dynamic stall is delayed and power output is further increased.

Figure 1:
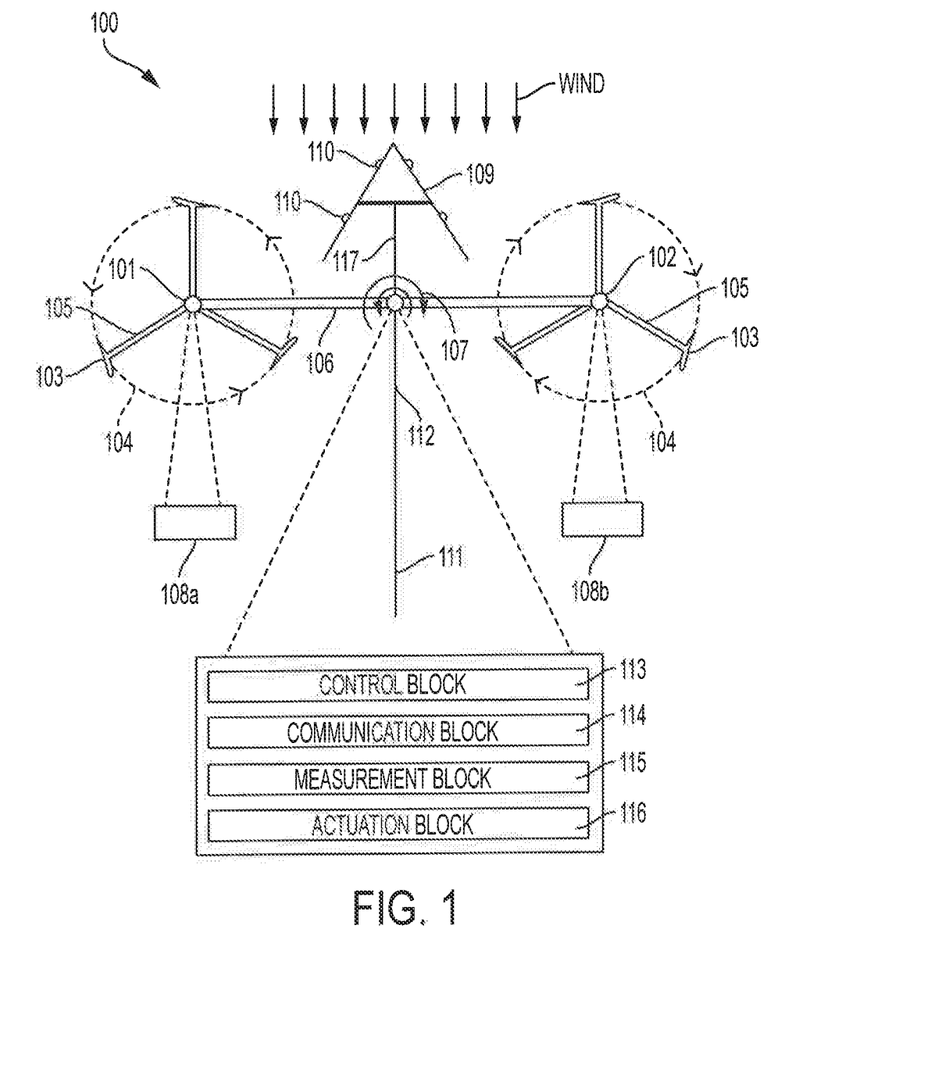
FIG. 1 shows a top view of a counter-rotating vertical axis wind turbine according to an embodiment.

FIG. 1 shows an embodiment of VAWT 100 according to inventive concepts described herein. At each of first vertical axis of rotation 101 and second vertical axis of rotation 102, counter-rotating blades 103 rotate in opposing directions. Dashed lines 104 show a path of movement of counter-rotating blades 103. According to FIG. 1, the direction of the arrows denotes the respective rotational direction of each path 104 about each axis of rotation 101 and 102. However, it should be pointed out that the rotational direction about each axis of rotation 101 and 102 can be opposite to that shown by the illustrated arrows, provided that rotor blades 103 are counter-rotating. In one embodiment, counter-rotating blades 103 are straight and extruded from an airfoil, and are connected to first vertical axis of rotation 101 or second vertical axis of rotation 102 by struts 105.

Figure 2:
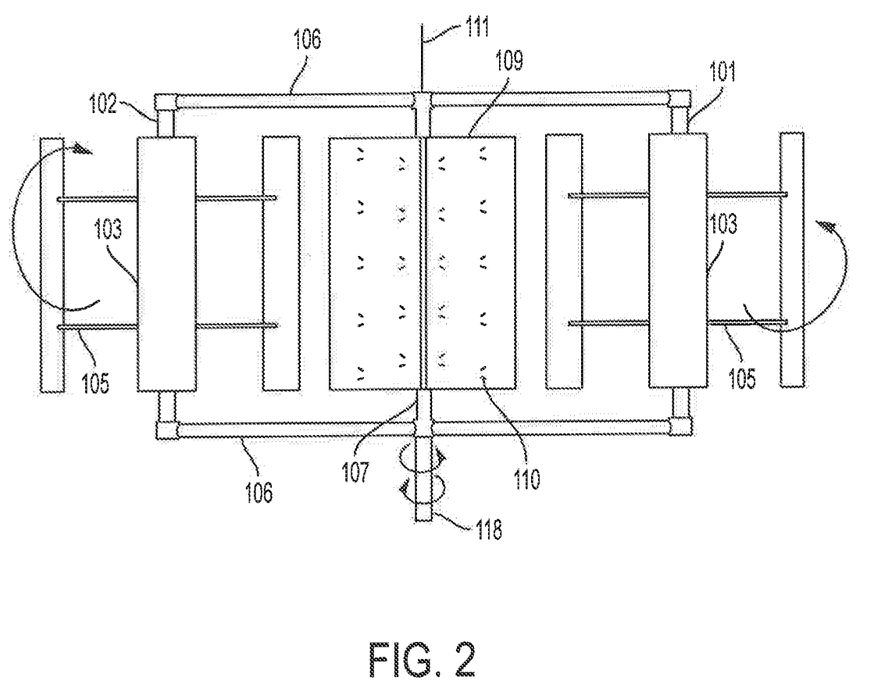
FIG. 2 shows a front view of a counter-rotating vertical axis wind turbine according to an embodiment.

First vertical axis of rotation 101 and second vertical axis of rotation 102 are supported by frame 106, which, as shown in FIG. 2, extends between the upper ends and lower ends of both first vertical axis of rotation 101 and second vertical axis of rotation 102. Frame 106, together with first vertical axis of rotation 101 and second vertical axis of rotation 102, is connected to and rotatable about intermediate axis of rotation 107. Intermediate axis of rotation 107 is located at or about a midpoint of a line between first vertical axis of rotation 101 and second vertical axis of rotation 102, and extends from tower 118. In an embodiment, tower 118 can extend between another structure, such as a building, and VAWT 100. In other embodiments, tower 118 can extend between VAWT 100 and, e.g., the ground or other anchoring mechanism.

From the direction of oncoming wind, deflector 109 is positioned in front of intermediate axis of rotation 107 and connected thereto by deflector support 117. Deflector 109 is characterized by a vertex and two symmetrical deflecting surfaces that extend from the vertex toward rotors on first vertical axis of rotation 101 and second vertical axis of rotation 102. In the shown embodiment, the vertex of deflector 109 is positioned forward of intermediate axis of rotation 107 in a way that a line between the vertex of deflector 109 and intermediate axis of rotation 107 is perpendicular or substantially perpendicular to frame 106.

Vortex generators 110 are positioned at the deflecting surfaces of deflector 109. This is important because the inclusion of vortex generators 110 improves airflow conditions at or near the rotors. Also, according to embodiments, the number, shape, and positions of vortex generators 110 can be configured to optimize performance under various conditions. For instance, a control system or control block (e.g., control block 113) can communicate signals to change the orientation of vortex generators 110 on one or more deflecting surfaces. Changes in the orientation can include changing the positions of one or more vortex generators 110 with respect to one another on each of the deflecting surfaces as well as changing the angle of attack for one or more vortex generators 110 by, e.g., rotating them with respect to the direction of oncoming wind. For instance, under some conditions, it may be desirable to arrange vortex generators 110 in a vertical linear fashion, with each being above or below the other. Under other conditions, it may be desirable to stagger vortex generators 110 with respect to one another, such that one vortex generator 110 is partially or completely behind another vortex generator 110 with respect to the direction of oncoming wind. Further, the angle of attack can be changed according to observed conditions where, e.g., the nose of one or more vortex generators 110 can be rotated upward or downward.

The orientations or configurations of vortex generators 110 can be set according to measured wind speed, wind direction, wind variability, and the like. Changes in orientation or configuration of vortex generators 110 can be made to optimize power output under changes in one or more of the foregoing conditions. Further, changes can be made based on measuring a suboptimal power output under one set of conditions and changing the orientation or configuration until an optimal or desirable output is achieved.

In some embodiments, optimal settings for vortex generators 110 can be stored for a given environmental conditions. When those environment conditions are observed or measured at VAWT 100 or control block 113 (which can be local to or remote from VAWT 100), optimized settings for those measured conditions can be retrieved from and applied by a control system or control block 113 automatically. Doing so enables optimizing power output under variable conditions in automated fashion. This, of course, allows VAWT 100 to dynamically change according to environmental conditions and maximize power output over time.

Figure 3:
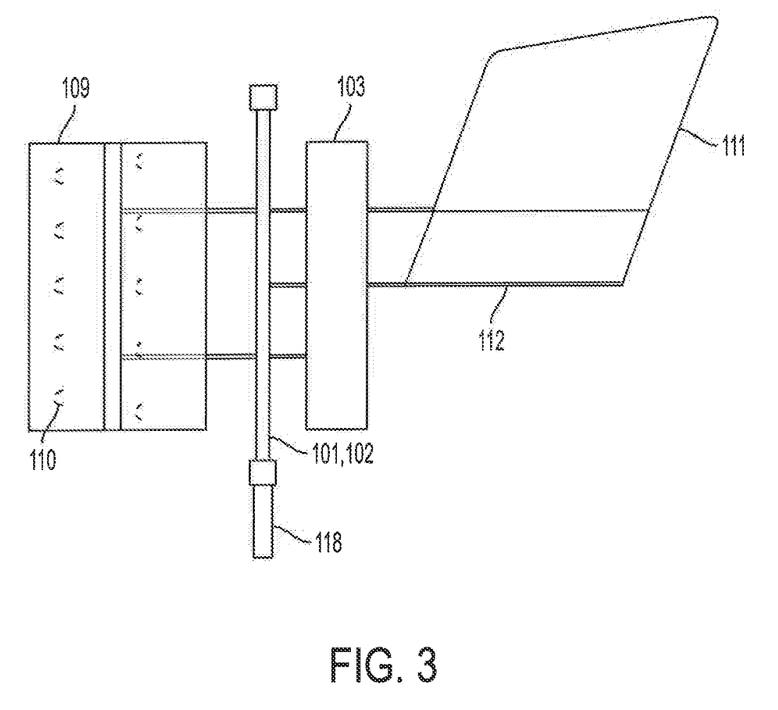
FIG. 3 shows a side view of a counter-rotating vertical axis wind turbine according to an embodiment.
Figure 4:
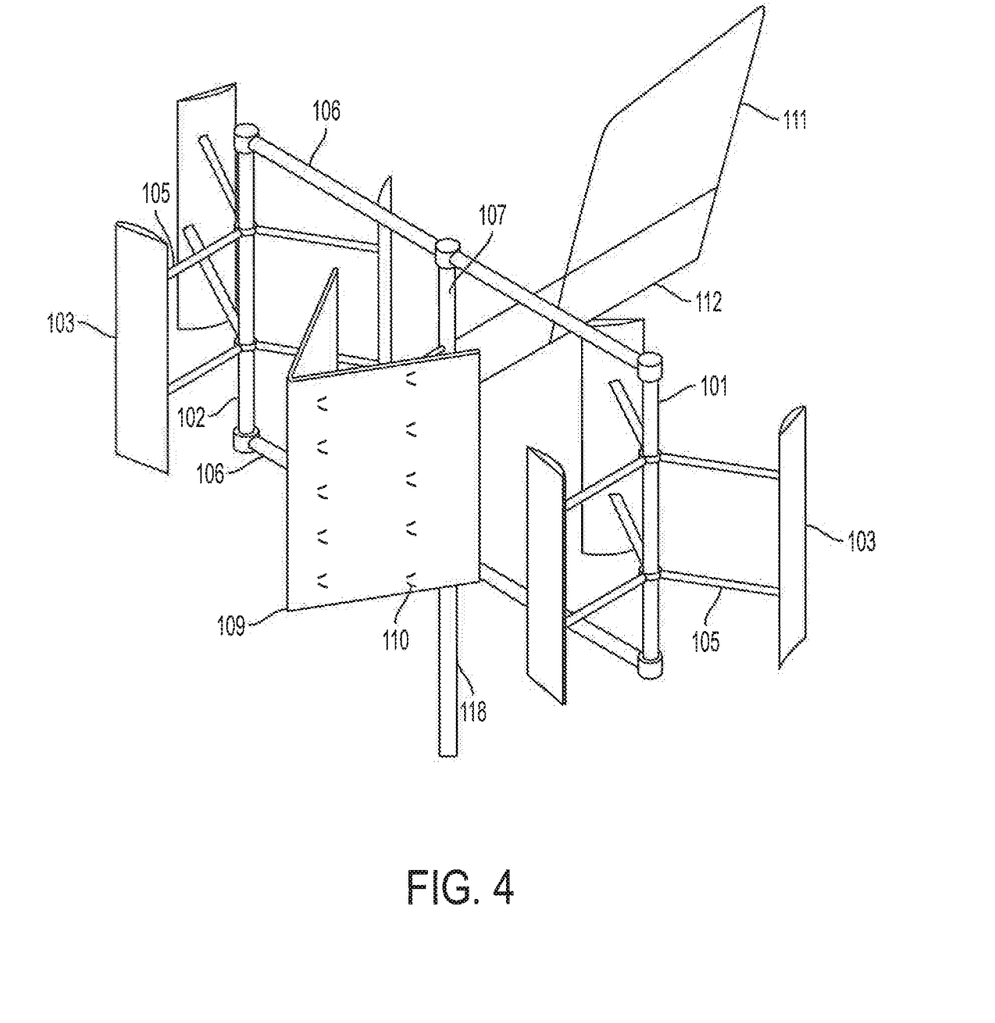
FIG. 4 shows a perspective view of a counter-rotating vertical axis wind turbine according to an embodiment.

As best seen at FIGS. 3 and 4, wind vane 111 is positioned at the back of intermediate axis of rotation 107 with respect to the direction of oncoming wind and is perpendicular or substantially perpendicular to frame 106. Wind vane Ill is connected to intermediate axis of rotation 107 by wind vane support 112. Wind vane 111 and wind vane support 112 operate to orient the vertex of deflector 109 toward the direction of oncoming wind. In doing so, wind vane 111 and wind vane support 112 rotate about intermediate axis of rotation 107 in conjunction with other components during operation of VAWT 100.

According to embodiments, first vertical axis of rotation 101 and second vertical axis of rotation 102 and are connected via some kind of gearbox or via belts or chains to drive generator(s) mounted to frame 106. According to FIG. 1, generator 108*a* is in communication with first vertical axis of rotation 101 and generator 108*b* is in communication with second vertical axis of rotation 102. The generated energy can then be stored at or near VAWT 100 or transferred by conductors to a remote storage facility. Also, embodiments are envisioned where an array of VAWTs 100 are employed through a grid or the like.

As discussed, the distance between first vertical axis of rotation 101 and second vertical axis of rotation 102 can be adjusted according to desired operating parameters. Such changes are enabled by control block 113. Accordingly, in one embodiment, counter-rotating blades 103 are closely spaced with respect to one another. Such an arrangement enables a higher number of VAWTs 100 to be placed in a local area, i.e., the packing density of multiple VAWTs 100 increases. This contributes to increased power production in a localized area. In some instances, it may be desirable for a portion of first vertical axis of rotation 101 and second vertical axis of rotation 102 to be positioned behind deflector 109. This allows blades 103 returning against the direction of oncoming wind to be partially or completely shielded by deflector 109.

In another embodiment, counter-rotating blades 103 are moved further apart, such each of counter-rotating blades 103 are to the side of deflector 109. This increases the effective swept area without an increase in rotor diameter (i.e., where an increase in diameter generally yields lower RPMs). This can be advantageous considering that power output of a wind turbine is generally a linear function of the so-called swept area. In the case of a VAWT, the swept area can be expressed as the product of rotor diameter and rotor height: D×H.

According to experimental results, operation of counter-rotating blades 103 effectively balances the Magnus effect induced by the individual rotors. This alleviates vibration and improves structural stability. Importantly, the counter-rotation of blades 103 also transforms the asymmetrical wake of the individual rotors into a symmetrical wake, making the micro-siting of turbines much more straightforward.

In operation, when oncoming wind encounters VAWT 100, deflector 109 effectively guides and accelerates the oncoming wind toward counter-rotating blades 103. As a result, the wind speed at counter-rotating blades 103 is significantly increased and power output is increased in direct relationship to the increase in wind speed.

Using deflector 109, the guided airflow develops a cross-stream component that enhances lift production when blade 103 operates in the downstream half-revolution. As a result, embodiments of VAWT 100 enable excellent self-starting performance even in low-speed regions, such as urban and offshore areas.

Vortex generators 110 positioned at the deflecting surfaces of deflector 109 serve two important functions. First, vortex generators 110 further regulate the guided airflow to flow mainly along the stream-wise direction, which serves the interest of lift production and thereby power output. Second, vortex generators 110 produce small-scale vortices on the order of magnitude of counter-rotating blades 103. The vortices produced by vortex generators 110 energize the boundary layers of counter-rotating blades 103. As a result, dynamic stall is delayed. This significantly contributes to increased lift production, and therefore, increased power output provided by embodiments of VAWT 100.

To maximize power output over time, wind vane 111 is built to force deflector 109 to face the direction of oncoming wind. Wind vane 111 is easy to manufacture and provides robust performance in urban areas, in which wind direction frequently changes. Consequently, wind vane 111 is a cost-effective way to turn VAWT 100, and specifically the vertex of deflector 109, to face oncoming wind.

It should be appreciated that a VAWT's power output over time is maximized where the VAWT rotates in a resonant state. As such, described embodiments are implemented to maximize power output under different conditions, e.g., different and or variable wind speed and wind direction. In an embodiment a computational model is implemented, e.g., in control block 113, to evaluate a VAWT's power output under a particular set of observed conditions or estimate power output under predicted future conditions, or even purely hypothetical conditions. The computational model is implemented to maximize a VAWT's power output by effectuating changes, e.g., the distance between first vertical axis of rotation 101 and second vertical axis of rotation 102 with respect to one another and deflector 109, the orientation of VAWT 100 with respect to oncoming wind, the angle of the deflector surfaces 109, the configuration and/or orientation of vortex generators 110 on the deflecting surfaces of deflector 109 and the like, under a set of environmental conditions.

The computational model used to maximize power output over time can be implemented in hardware, software, firmware, or a combination of each. In some embodiments, all or a part of control block 113 is local to VAWT 100, while in other embodiments control block is remote to VAWT 100 and communication is effectuated over wireless networks and the like.

According to the embodiment shown at FIG. 1, each VAWT 100 contains control block 113, which has stand-alone on-board processing components sufficient to analyze measured environmental data and execute instructions to maximize VAWT power output in response to that analysis. Accordingly, each VAWT 100 is capable of operating independently of other VAWTs and is responsible for maximizing its own power output. According to particular embodiments, control block 113 may employ the computational model at the VAWT itself to obtain a set of instructions for optimizing power output according to local conditions. However, control block 113 may also retrieve instructions from a remote location, where the computational model has been executed at that remote location. In any event, control block 113, whether at VAWT 100 or remote thereto, executes the instructions necessary to achieve optimized VAWT instructions.

As mentioned, VAWTs may operate in a grid. As such, it may be advantageous for one VAWT 100 in the grid to be aware of the behavior of other VAWTs in the grid. Accordingly, control block 113 may further contain on-board communication components, e.g., RF (radio frequency) wireless communication block 114, to enable VAWTs to share information such as local power output data, local environmental conditions, etc. This information may be shared directly between VAWTs or may be transmitted to one or more remote stations, where the remote stations collect and distribute the information among the VAWTs. Sharing this information may be beneficial for predicting local environmental conditions at a given VAWT and making necessary adjustments to maximize power in anticipation of those conditions.

Other embodiments are envisioned where each VAWT contains minimal hardware, software, etc., such that the bulk of data processing is performed at one or more remote stations. In these cases, the components of control block 113 are typically shared between a VAWT 100 and a central station. According to such embodiments, each VAWT is equipped with components required to effectuate adjustments needed to maximize power output, but is not required to contain data processing components. Rather, remote stations are employed to process the data and perform other functions, such as monitoring individual VAWT performance, executing remote diagnostic assistance, performing trouble shooting, and the like. The remote stations may be located within a grid or may be located at a remote location. Also, these remote stations may be configured to operate autonomously, or may provide a user interface where an operator interacts with the system and enables execution of the monitoring and diagnostic functions described above.

The concepts of information-sharing between VAWTs in a single grid can be readily applied to VAWTs in different grids, where VAWTs contained in different grids communicate with one another, or centralized nodes associated with a particular grid communicate with centralized nodes associated with other grids. Such inter-grid communication may assist one grid in preparing for predicted environmental conditions, whether that information is shared directly with VAWTs in the grids or sent to a central node and then distributed among VAWTs.

According to an embodiment, the computational model mentioned above reveals that, for a VAWT 100, the rotational speed of the working VAWT, and likewise its energy output, depends upon wind speed, wind speed variability, and changes in wind direction.

In view of the foregoing, each VAWT 100 includes measurement block 115, which is responsible for measuring these conditions and communicating the same to control block 113. To that end, measurement block 115 includes measurement instruments for measuring wind speed, wind direction, and the like. Measurement block 115 may stand alone from control block 113 as an independent subsystem or may be configured as part of control block 113 itself. In any event, the relevant problem becomes one of maximizing power output, i.e., finding the resonant or near resonant state of the working VAWT, under present conditions or under predicted conditions.

To that end, VAWT 100 can be brought to a resonant or near resonant state by varying the distance between first vertical axis of rotation 101 and second vertical axis of rotation 102 with respect to one another and deflector 109, the orientation of VAWT 100 with respect to oncoming wind, the angle of the deflector surfaces 109, the configuration and/or orientation of vortex generators 110 on the deflecting surfaces of deflector 109 and the like. Therefore, according to embodiments, the VAWT is brought to a resonant state (or substantially resonant state) by varying the distance between first vertical axis of rotation 101 and second vertical axis of rotation 102 with respect to one another and deflector 109, the orientation of VAWT 100 with respect to oncoming wind, the angle of the deflector surfaces 109, the configuration and/or orientation of vortex generators 110 on the deflecting surfaces of deflector 109 in response to observed conditions or based upon predicted conditions.

This is enabled by actuation block 116 is implemented to actuate first vertical axis of rotation 101 and second vertical axis of rotation 102 with respect to one another and deflector 109 between a minimum and maximum distance, change the orientation of VAWT 100 with respect to oncoming wind, the angle of the deflector surfaces 109, and/or change the configuration and/or orientation of vortex generators 110 on the deflecting surfaces of deflector 109. For a VAWT moving under the influence of wind speed, for any given set of conditions, there is an effective VAWT configuration at which the power output of a VAWT is maximized. By incorporating actuation block 116, which is operable to vary the distance and orientation of components of VAWT 100, settings can be tuned across a range of conditions.

As mentioned, control block 113, in combination with measurement block 115, measures and analyzes local environmental condition data and determines where vertical axis of rotation 101, second vertical axis of rotation 102, deflector 109, and vortex generators 110 should be positioned so that power output of VAWT 100 is maximized. According to embodiments, the mechanism for effectuating such changes can be implemented according to a number of different means. For example, a mechanical means, employing the use of hydraulic or gear-driven actuators, can be used to move components.

A VAWT's ability to independently tune its VAWT is important because, as a practical matter, a VAWT will be one VAWT within a grid of VAWTs. Therefore, it is desirable that each VAWT be capable of some degree of autonomous tuning to best adjust to local wind conditions. According to an embodiment, the computer model discussed herein comprises computer simulations that reveal a power "fingerprint" of a VAWT having a certain configuration under a given set of conditions. While real conditions may present a more complex system, nevertheless, these simulations yield fingerprints very similar to those found in the real-world conditions.

The invention described herein is made more robust by the implementation of system-wide "learning." According to an embodiment, a network system is provided where VAWTs within that system interact with one another, perhaps through a central station. The central station collects information related to wind conditions based, at least in part, upon a VAWT's power output fingerprint at a given configuration. The system "learns" these fingerprints as being associated with a set of environmental conditions and begins library of those conditions. Further, the system then adjust the configuration of a VAWT until it finds the optimum fingerprint for that set of conditions. After a "best setting" it can be disseminated throughout the system, either being stored centrally or locally at each VAWT.

By way of example, suppose VAWT 100 determines wind behavior through its on-board inertial sensors. VAWT 100, using control block 113, may first consult on-board memory within block 113 to look for ideal configuration settings to maximize its power output. If the on-board memory does not contain the measured conditions (or an optimized setting), then VAWT 100 may transmit the measured conditions to a central station using communication block 114. If the central station finds ideal configuration settings for the given conditions, it communicates the same to VAWT 100, which then implements those settings. If the central station does not find a match, it would inform VAWT 100 that no match is found and perhaps offer the closest configuration available. In any event, the conditions are recorded and stored in a library for future consultations. According to this system, the library will grow at an inverse exponential rate (i.e., where library growth decreases over time). In any event, the collective VAWT network becomes increasingly efficient at maximizing its power as the information data base market possible for each individual VAWT to rapidly achieve and maintain optimal tuning.

In some embodiments, consistent with other functions of control block 113 described herein, the orientation of deflector 109 can be further changed with mechanical assistance. For instance, a low power/low voltage servo motor or the like may be in mechanical communication with intermediate axis of rotation 107, and used to work alone or in combination with wind vane 111 to ensure deflector 109 is optimally oriented with respect to oncoming wind. Signals effective to actuate the servo motor can be transmitted from control block 113, which as discussed, can be remote or local to VAWT 100.

For further reference to described embodiments, FIG. 2 is a front view of VAWT 100 where counter-rotating blades 103 and deflector 109 are illustrated along span-wise direction. Also, the distribution of vortex generators 110 on deflector surfaces of deflector 109 can be observed. FIG. 3 is a side view of VAWT 100 where wind vane 111 can be observed. FIG. 4 is a perspective view of VAWT 100 from which an overview of the configuration embodiment is provided.

Figure 5:
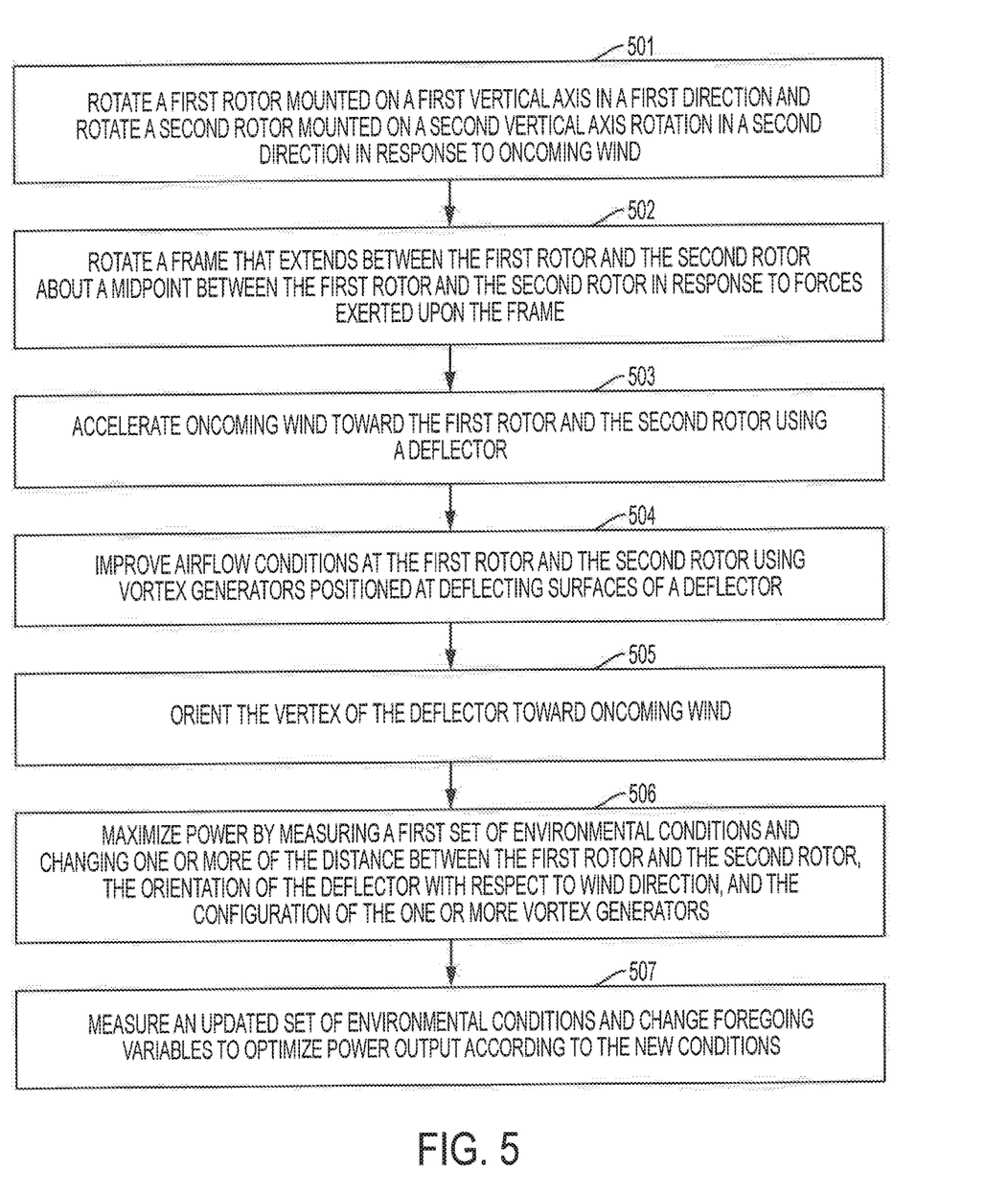
FIG. 5 shows a flow diagram of a method performed by a counter-rotating vertical axis wind turbine according to an embodiment.

FIG. 5 shows a flow diagram of an exemplary method performed according to the concepts described herein. Method 500 is performed to efficiently generate power from wind and can be executed by a vertical axis wind turbine, such as system 100 shown at FIG. 1.

At step 501, in response to oncoming wind, a first rotor mounted on a first vertical axis rotates in a first direction and a second rotor mounted on a second vertical axis of rotation rotates in a second direction.

At step 502, a frame that extends between and supports the first rotor and the second rotor is rotated about a midpoint between the first rotor and the second rotor. Consistent with the foregoing discussion, the frame can rotate about an intermediate axis of rotation in response to forces exerted upon the frame to orient one or more components, e.g., a deflector towards oncoming wind.

At step 503, oncoming wind is accelerated toward the first rotor and the second rotor. According to an embodiment, accelerating airflow at or near the first rotor and the second rotor is enabled by a deflector. The deflector can include a vertex, a first deflecting surface extending from the vertex toward the first rotor, and a second deflecting surface extending from the vertex toward the second rotor.

At step 504, airflow conditions are improved at the first rotor and the second rotor. According to embodiments, configurable vortex generators positioned at the deflecting surfaces can be utilized to improve conditions via different mechanisms. By utilizing vortex generators positioned on the first and second deflecting surfaces; and At step 505, the vertex of the deflector is oriented toward the oncoming wind. This can be accomplished by a vane at the rear of the VAWT that exerts forces on other components to orient them for maximum power output.

Optionally, at step 506, power can be further maximized by measuring a first set of environmental conditions at or near the VAWT. The measured environmental conditions can include wind speed, wind direction, and wind speed variability. Based on the measured conditions, one or more of the distance between the first rotor and the second rotor, the orientation of the deflector with respect to wind direction, the angle of the deflector surfaces 109, and the configuration of the one or more vortex generators can be changed. These changes can be based on the models discussed herein to enable maximizing power output according to the first environmental conditions. In some instances, changing the configuration of the vortex generators can include changing the angle of attack or the configuration of the vortex generators. For example, the position of the vortex generators can be changed with respect to the other. Further, in other instances, changing the distance between the first rotor and the second rotor can include minimizing the distance so that the first rotor and the second rotor are at least partially behind the deflector with respect to oncoming wind.

At step 507, an updated set of environmental conditions can be measured. Based on the new conditions, any of the foregoing variables can be changed to optimize power output according to the new conditions.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein can be utilized according to the present disclosure. Accordingly, the appended claims are intended to include within their scope such processes, machines, manufacture, compositions of matter, means, methods, or steps.

What is claimed is:

1. A counter-rotating vertical axis wind turbine, comprising:
    two counter-rotating rotors, where a first rotor is mounted on a first vertical axis of rotation and a second rotor is mounted on a second vertical axis of rotation;
    a frame that extends between and supports the first rotor and the second rotor, where the frame rotates about an intermediate axis of rotation that is positioned at a midpoint between the first rotor and the second rotor;
    a deflector to accelerate oncoming wind toward the first rotor and the second rotor, the deflector mounted to the frame and positioned between the first rotor and the second rotor, where the deflector comprises a vertex, a first deflecting surface extending from the vertex toward the first rotor, and a second deflecting surface extending from the vertex toward the second rotor, one or more vortex generators positioned on the first and second deflecting surfaces; and a vane mounted to the frame and to orient the vertex of the deflector to face oncoming wind.

2. The counter-rotating vertical axis wind turbine of claim 1 where the one or more vortex generators improve airflow conditions at the first rotor and the second rotor for power production, where the improving airflow conditions at the first rotor and the second rotor comprises creating small-scale vortices to augment momentum of boundary layer flows at the first rotor and the second rotor.

3. The counter-rotating vertical axis wind turbine of claim 1 further comprising:

a first generator in communication with the first rotor and a second generator in communication with the second rotor, where energy generated by the first and second generators is transmitted to another location.

4. The counter-rotating vertical axis wind turbine of claim 1 where the first and second rotors comprise straight-bladed rotors.

5. The counter-rotating vertical axis wind turbine of claim 1 further comprising a control block that, based on first environmental conditions, changes at least one of:

distance between the first rotor and the second rotor,
orientation of the deflector with respect to wind direction,
angle of the deflecting surfaces, and
a configuration of the one or more vortex generators
to optimize power output of the counter-rotating vertical axis wind turbine according to the first environmental conditions.

6. The counter-rotating vertical axis wind turbine of claim 5 where, based on second environmental conditions, the control block also changes at least one of:

distance between the first rotor and the second rotor,
orientation of the deflector with respect to wind direction,
angle of the deflecting surfaces, and
a configuration of the one or more vortex generators
to optimize power output of the counter-rotating vertical axis wind turbine according to the second environmental conditions.

7. The counter-rotating vertical axis wind turbine of claim 5 where changing the configuration of the one or more vortex generators comprises:

changing the angle of attack of the configuration of the one or more vortex generators, and
changing the position of the one or more vortex generators with respect to one another.

8. The counter-rotating vertical axis wind turbine of claim 5 where changing the distance between the first rotor and the second rotor comprises minimizing the distance so that the power output is maximized.

9. The counter-rotating vertical axis wind turbine of claim 5 where the first environmental conditions comprises at least one of:

wind speed, wind direction, and wind speed variability.

10. A method for maximizing power output of a counter-rotating vertical axis wind turbine, the method comprising:

in response to oncoming wind, rotating a first rotor mounted on a first vertical axis of rotation in a first direction and a second rotor mounted on a second vertical axis of rotation in a second direction;
rotating a frame that extends between and supports the first rotor and the second rotor, where the frame rotates about an intermediate axis of rotation that is positioned at a midpoint between the first rotor and the second rotor;
accelerating the oncoming wind toward the first rotor and the second rotor with a deflector comprising a vertex, a first deflecting surface extending from the vertex toward the first rotor, and a second deflecting surface extending from the vertex toward the second rotor,
improving airflow conditions at the first rotor and the second rotor by utilizing vortex generators positioned on the first and second deflecting surfaces; and
orienting the vertex of the deflector toward the oncoming wind.

11. The method of claim 10 further comprising:

measuring a first set of environmental conditions, and changing one of:

distance between the first rotor and the second rotor,
orientation of the deflector with respect to wind direction,
angle of the deflecting surfaces, and
a configuration of one or more vortex generators of the vortex generators,
to optimize power output of the counter-rotating vertical axis wind turbine according to the first environmental conditions.

12. The method of claim 11 where changing the configuration of the one or more vortex generators comprises:

changing the angle of attack of the configuration of the one or more vortex generators, and
changing the position of the one or more vortex generators with respect to one another.

13. The method of claim 11 where changing the distance between the first rotor and the second rotor comprises minimizing the distance so that the power output is maximized.

14. The method of claim 11 where the first environmental conditions comprises at least one of:

wind speed, wind direction, and wind speed variability.

* * * * *